(12) United States Patent
Tsegaye et al.

(10) Patent No.: US 10,678,004 B2
(45) Date of Patent: Jun. 9, 2020

(54) MULTIPLE WAVEGUIDE ALIGNMENT

(71) Applicant: Lumentum Operations LLC, Milpitas, CA (US)

(72) Inventors: Tedros Tsegaye, Milpitas, CA (US); Barthelemy Fondeur, San Jose, CA (US); Dilu He, Milpitas, CA (US); Kejia Li, Milpitas, CA (US); Brad Levin, Milpitas, CA (US)

(73) Assignee: Lumentum Operations LLC, Milpitas, CA (US)

(*) Notice: Subject to any disclaimer, the term of this patent is extended or adjusted under 35 U.S.C. 154(b) by 49 days.

(21) Appl. No.: 16/165,365

(22) Filed: Oct. 19, 2018

(65) Prior Publication Data

US 2020/0041733 A1 Feb. 6, 2020

Related U.S. Application Data

(60) Provisional application No. 62/713,386, filed on Aug. 1, 2018.

(51) Int. Cl.
*G02B 6/42* (2006.01)
(52) U.S. Cl.
CPC .............. *G02B 6/4225* (2013.01); *G02B 6/42* (2013.01); *G02B 6/4227* (2013.01)

(58) Field of Classification Search
CPC ....... G02B 6/4225; G02B 6/4227; G02B 6/42
USPC .................................................. 250/227.24
See application file for complete search history.

(56) References Cited

U.S. PATENT DOCUMENTS

| | | | |
|---|---|---|---|
| 7,272,273 B2* | 9/2007 | Yan .................... | G02B 6/12019 385/129 |
| 8,515,278 B2* | 8/2013 | Cheng ................ | G02B 6/12004 385/96 |

* cited by examiner

*Primary Examiner* — Seung C Sohn
(74) *Attorney, Agent, or Firm* — Harrity & Harrity, LLP

(57) ABSTRACT

According to some possible implementations, an optical device may include a plurality of photodiodes, wherein alignment of the plurality of photodiodes with a fixed separation to a plurality of multi-mode waveguides disposed on an optical waveguide chip and with the same fixed separation is optimized by alignment of at least one of the plurality of photodiodes to at least one single-mode waveguide and translation of the optical waveguide chip relative to the plurality of photodiodes by a fixed offset of the at least one single-mode waveguide relative to the plurality of multi-mode waveguides.

20 Claims, 9 Drawing Sheets

MULTIPLE WAVEGUIDE ALIGNMENT

RELATED APPLICATION(S)

This application claims priority under 35 U.S.C. § 119 to U.S. Provisional Patent Application No. 62/713,386, filed on Aug. 1, 2018, the content of which is incorporated by reference herein in its entirety.

TECHNICAL FIELD

The present disclosure relates to waveguide alignment. More particularly, some aspects of the present disclosure relate to alignment of multiple waveguides in an array to a photodiode array.

BACKGROUND

An arrayed waveguide grating (AWG) device associated with a demultiplexer may provide for communication of multiple channels of an optical signal. For example, a high-speed multichannel receiver of a network node (e.g., a 100 Gigabits per second (Gbps) data rate capacity receiver, a 200 Gbps data rate capacity receiver, a 400 Gbps data rate capacity receiver, and/or the like) may couple to multiple output waveguides of an arrayed waveguide grating of a coarse wavelength division multiplexing (CWDM) demultiplexer or another type of demultiplexer to receive information from a high-speed multichannel transmitter of another network node. The high-speed multi-channel receiver may include a photodiode array to receive optical signals from the multiple output waveguides of the arrayed waveguide grating. In this case, each waveguide of the multiple output waveguides may be optically coupled to a corresponding photodiode of the high-speed multi-channel receiver.

The multiple output waveguides of the arrayed waveguide grating device may be multi-mode waveguides to ensure a flat-top response in the photodiodes. The flat-top response may refer to an intensity of optical signals received by each photodiode at a set of wavelength ranges being relatively even (e.g., a peak intensity in the set of wavelength range may be within a threshold percentage of a minimum intensity in the set of wavelength ranges). The multiple modes may refer to multiple different distributions of intensities that may be associated with a wavelength of an optical signal, a temperature at which the optical signal is provided, and/or the like. By achieving the flat-top response for the multiple output waveguides, the multi-mode waveguides may enable the photodiodes of the high-speed multi-channel receiver to efficiently receive optical signals.

SUMMARY

According to some possible implementations, an optical device may include a plurality of photodiodes, wherein alignment of the plurality of photodiodes with a fixed separation to a plurality of multi-mode waveguides disposed on an optical waveguide chip and with the same fixed separation is optimized by alignment of at least one of the plurality of photodiodes to at least one single-mode waveguide and translation of the optical waveguide chip relative to the plurality of photodiodes by a fixed offset of the at least one single-mode waveguide relative to the plurality of multi-mode waveguides.

According to some possible implementations, a method may include determining, by a device, an input to a photodiode, of a set of photodiodes from a single-mode waveguide on a planar lightwave circuit (PLC) that has fixed separation from a set of multi-mode waveguides on the PLC. The method may include determining, by the device, an adjustment to an alignment of the single-mode waveguide to the photodiode based on the input to the photodiode. The method may include providing, by the device, information identifying the adjustment of the alignment, wherein, after applying the adjustment to the alignment, the set of photodiodes is translated relative to the PLC based on a fixed offset of the single-mode waveguide to an adjacent multi-mode waveguide of the set of multi-mode waveguides to enable the set of photodiodes to receive an output of the set of multi-mode waveguides.

According to some possible implementations, a planar lightwave circuit (PLC) may include a plurality of multi-mode waveguides. The PLC may include at least one single-mode waveguide, wherein the at least one single-mode waveguide is separated from the plurality of multi-mode waveguides by a fixed separation, and wherein the at least one single-mode waveguide is to provide an output to optimize an alignment of a plurality of outputs of the plurality of multi-mode waveguides.

DETAILED DESCRIPTION

The following detailed description of example implementations refers to the accompanying drawings. The same reference numbers in different drawings may identify the same or similar elements.

As described above, an arrayed waveguide grating may include multiple multi-mode waveguides with outputs to direct an optical signal to a receiver. For example, in a CWDM demultiplexer, an array waveguide grating may direct optical signals, from a transmitter, to multiple photodiodes of a receiver to enable the multiple photodiodes to receive the optical signals, thereby enabling communication. However, photodiodes of a receiver may be associated with a relatively small reception area. When the waveguides of the arrayed waveguide grating are misaligned to reception areas of photodiodes of the receiver, and as a result of beam steering of beams directed by the arrayed waveguide grating causing a ripple condition, a portion of the optical signals may not be successfully received by the photodiodes and processed by the receiver. For example, a varying output responsivity of the photodiodes, resulting from the portion of the optical signals not being successfully received, may negatively impact communication of information using the optical signals. Because the multi-mode waveguides may provide differing portions of light at different modes based on a temperature, a wavelength, and/or the like, it may be difficult to align a multi-mode waveguide to a photodiode based on an output of the multi-mode waveguide.

Some implementations, described herein, enable alignment of multiple waveguides. For example, some implementations, described herein may align a photodiode, of a photodiode array, to a single-mode waveguide, of the multiple waveguides. In this case, based on using an output of a single-mode waveguide, a difficulty in achieving a threshold level of alignment of the single-mode waveguide to the photodiode may be reduced relative to attempting to achieve the threshold level of alignment based on an output of a multi-mode waveguide. Further, the single-mode waveguide may be associated with a fixed offset to a set of multi-mode waveguides of the arrayed waveguide device. In this case, based on aligning the photodiode to the single-mode waveguide, the photodiode array may be translated by a particular translation distance corresponding to the fixed offset relative to the set of multi-mode waveguides, thereby enabling alignment of the multi-mode waveguides to photodiodes of the photodiode array. In this case, an alignment of photodiode arrays to multi-mode waveguides may be improved, without using complex, time-consuming, or expensive measurement techniques. Moreover, based on improving the alignment, a responsivity of the photodiodes of the photodiodes array may be balanced and above a threshold responsivity, thereby improving optical communications.

Figure 1A:
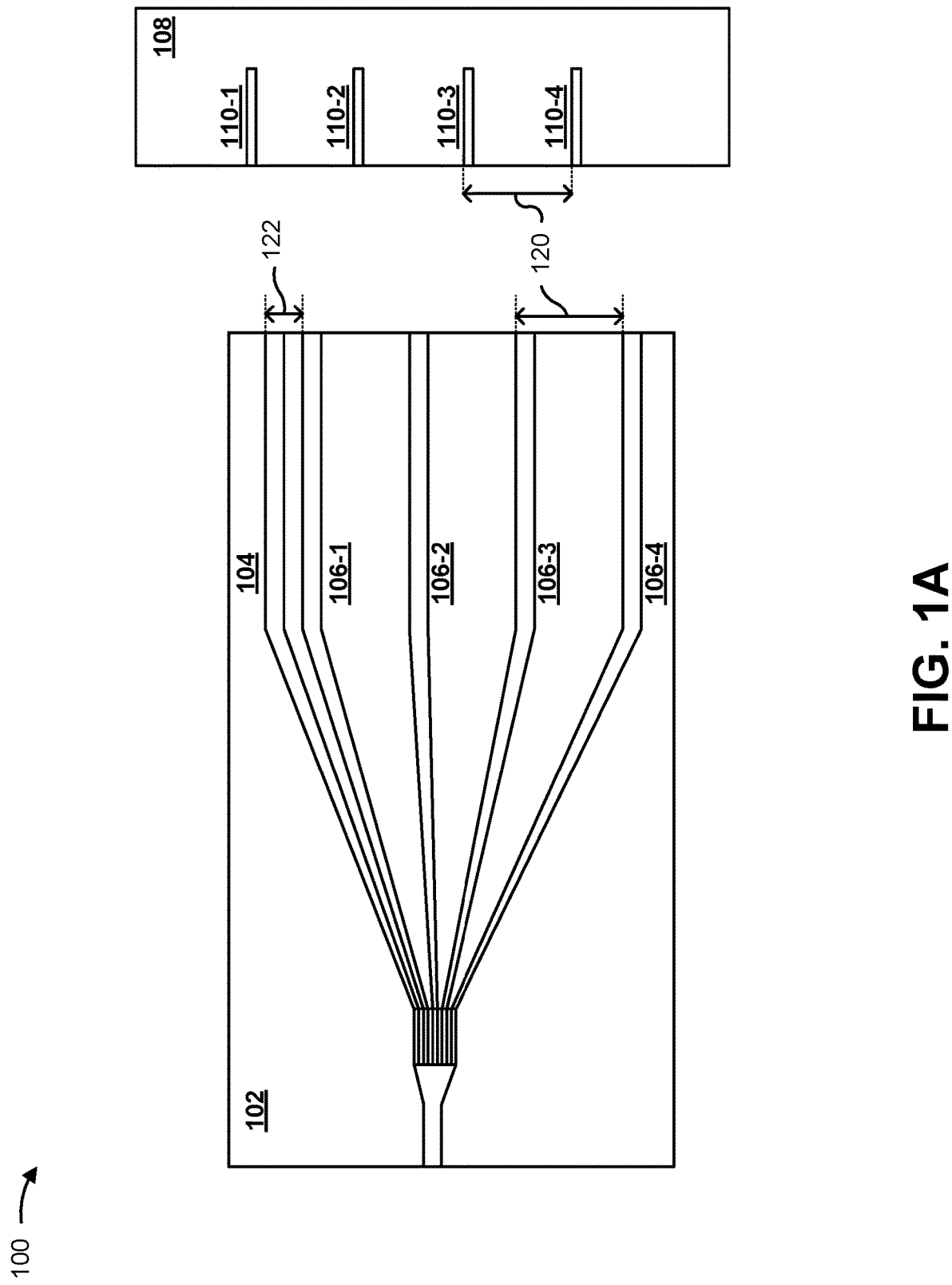
FIGS. 1A-1E are diagrams of an example implementation described herein.

FIGS. 1A-1E are diagrams of an example implementation 100 of alignment of multiple output waveguides to a set of photodiodes. As shown in FIG. 1A, example implementation 100 includes an arrayed waveguide grating device 102, which includes a single-mode waveguide 104 and a set of multi-mode waveguides 106 (e.g., shown as multi-mode waveguides 106-1, 106-2, 106-3, and 106-4), and a photodiode array 108, which includes a set of photodiodes 110 (e.g., shown as photodiodes 110-1, 110-2, 110-3, and 110-4).

In some implementations, arrayed waveguide grating device 102 may be included in a node of a network for optical communication. For example, arrayed waveguide grating device 102 may demultiplex wavelength channels to a receiver of the CWDM node or another type of demultiplexer node to enable reception of optical communications at the CWDM node. In some implementations, arrayed waveguide grating device 102 may be associated with a planar lightwave circuit (PLC) substrate. For example, single-mode waveguide 104 and multi-mode waveguides 106 may be disposed on a PLC chip. In some implementations, multi-mode waveguides 106 may be rectangular multi-mode waveguides. As shown by reference number 120, each multi-mode waveguide 106 may be associated with a fixed separation. For example, multi-mode waveguide 106-3 and multi-mode waveguide 106-4 may be associated with a fixed separation lithographically defined by the PLC substrate onto which arrayed waveguide grating device 102 is disposed. In some implementations, each multi-mode waveguide 106 may be associated with the same fixed separation. For example, multi-mode waveguide 106-1 may be separated from multi-mode waveguide 106-2, multi-mode waveguide 106-2 may be separated from multi-mode waveguide 106-3, and multi-mode waveguide 106-3 may be separated from multi-mode waveguide 106-4 by the same distance. In some implementations, different pairs of multi-mode waveguides 106 may be associated with different separations.

In some implementations, each pair of adjacent photodiodes 110 may be associated with a same fixed separation as a corresponding pair of adjacent multi-mode waveguides 106. For example, photodiode 110-3 and photodiode 110-4 may be associated with a same separation as multi-mode waveguide 106-3 and multi-mode waveguide 106-4. In some implementations, the same separation may be defined relative to center points of a pair of photodiodes 110 and/or a pair of waveguides 106. In this way, each multi-mode waveguide 106 may be aligned to a corresponding photodiode 110 to enable the corresponding photodiode to receive, as input, an output of a multi-mode waveguide 106.

As further shown in FIG. 1A, and by reference number 122, single-mode waveguide 104 may be separated from an adjacent multi-mode waveguide 106 (e.g., multi-mode waveguide 106-1) by a fixed offset that may be lithographically defined by the PLC substrate onto which arrayed waveguide grating device 102 is disposed. In some implementations, arrayed waveguide grating device 102 may include a single single-mode waveguide 104 paired to an adjacent multi-mode waveguide 106. In some implementations, arrayed waveguide grating device 102 may include multiple single-mode waveguides 104 paired to multiple adjacent multi-mode waveguides 106. In this case, each single-mode waveguide 104 may be associated with a same fixed offset from a corresponding adjacent multi-mode waveguide 106, thereby enabling translation of arrayed waveguide grating device 102 relative to photodiode array 108 by the fixed offset to align multi-mode waveguides 106 to photodiodes 110.

Although some implementations, described herein, may be described in terms of a particular quantity of single-mode waveguides 104, multi-mode waveguides 106, and/or photodiodes 110, other quantities of single-mode waveguides 104, multi-mode waveguides 106, and/or photodiodes 110, may be possible.

Figure 1B:
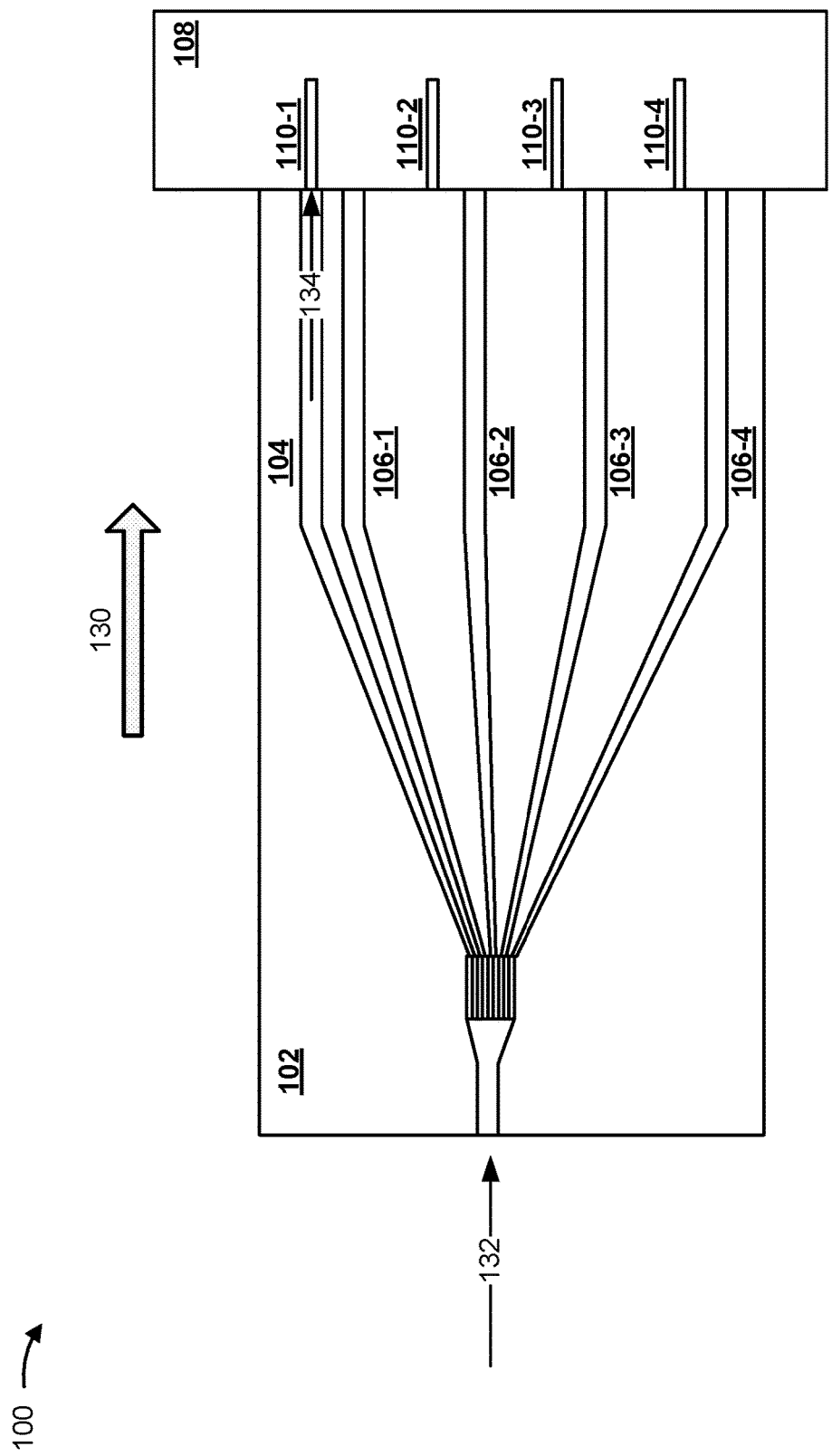

As shown in FIG. 1B, and by reference number 130, arrayed waveguide grating device 102 may be positioned such that single-mode waveguide 104 is optically coupled to photodiode 110-1. For example, photodiode array 108 may be moved relative to a PLC on which arrayed waveguide grating device 102 is disposed. As shown by reference numbers 132 and 134, light may be provided via arrayed waveguide grating device 102 such that single-mode waveguide 104 outputs light, and photodiode 110-1 receives the outputted light as input. In some implementations, single-mode waveguide 104 may provide light associated with a particular wavelength range. For example, photodiode 110-1 may receive light from single-mode waveguide 104 that is outside of an operation band of arrayed waveguide grating device 102.

Figure 1C:
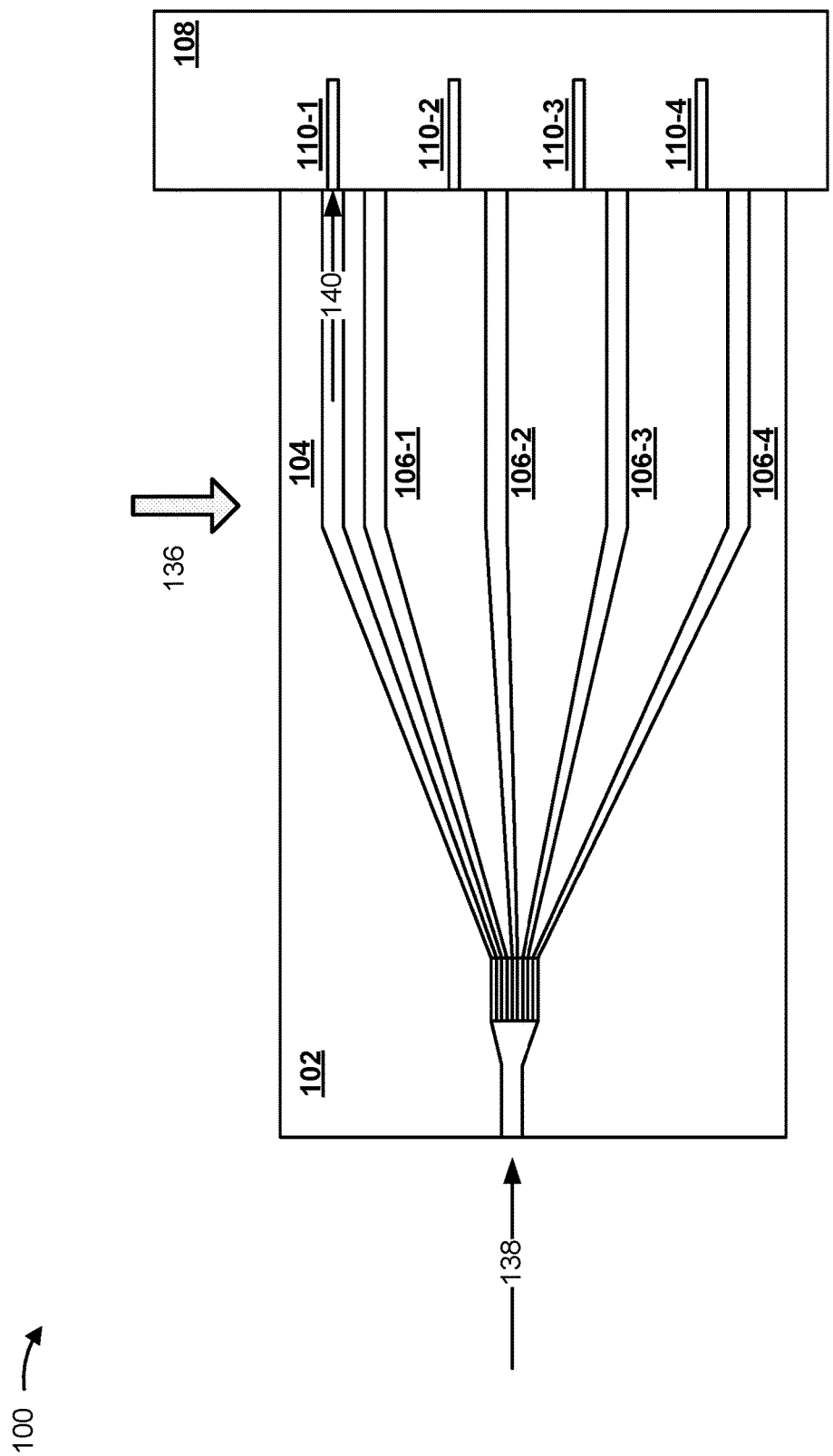

As shown in FIG. 1C, and by reference number 136, arrayed waveguide grating device 102 may be repositioned such that single-mode waveguide 104 is optically aligned to photodiode 110-1. Input 138 may be provided to arrayed waveguide grating device 102, which may provide output 140 to photodiode 110-1 via single-mode waveguide 104, and an adjustment to an alignment of single-mode waveguide 104 to photodiode 110-1 may be determined (e.g., by an alignment device, by a technician, etc.). In this case, photodiode array 108 may be re-aligned to arrayed waveguide grating device 102 based on the adjustment to the alignment. In this case, the alignment may be determined such that a center-point of single-mode waveguide 104 is aligned to a center-point of photodiode 110-1.

In some implementations, photodiode array 108 may undergo multiple movements to adjust the alignment. For example, a first adjustment to the alignment of single-mode waveguide 104 to photodiode 110-1 may be determined based on first input and photodiode array 108 may undergo a first re-alignment, then a second adjustment to the alignment of single-mode waveguide 104 to photodiode 110-1 may be determined based on second input and photodiode array 108 may undergo a second re-alignment. In this case, re-alignment may continue until input to photodiode 110-1 indicates a threshold level of alignment, which may correspond to a threshold photodiode response. In this way, based on using single-mode waveguide 104 to align to photodiode 110-1, an error in a photodiode response may be reduced relative to attempting to achieve alignment using multiple modes of output of a multi-mode waveguide, such as multi-mode waveguides 106.

Figure 1D:
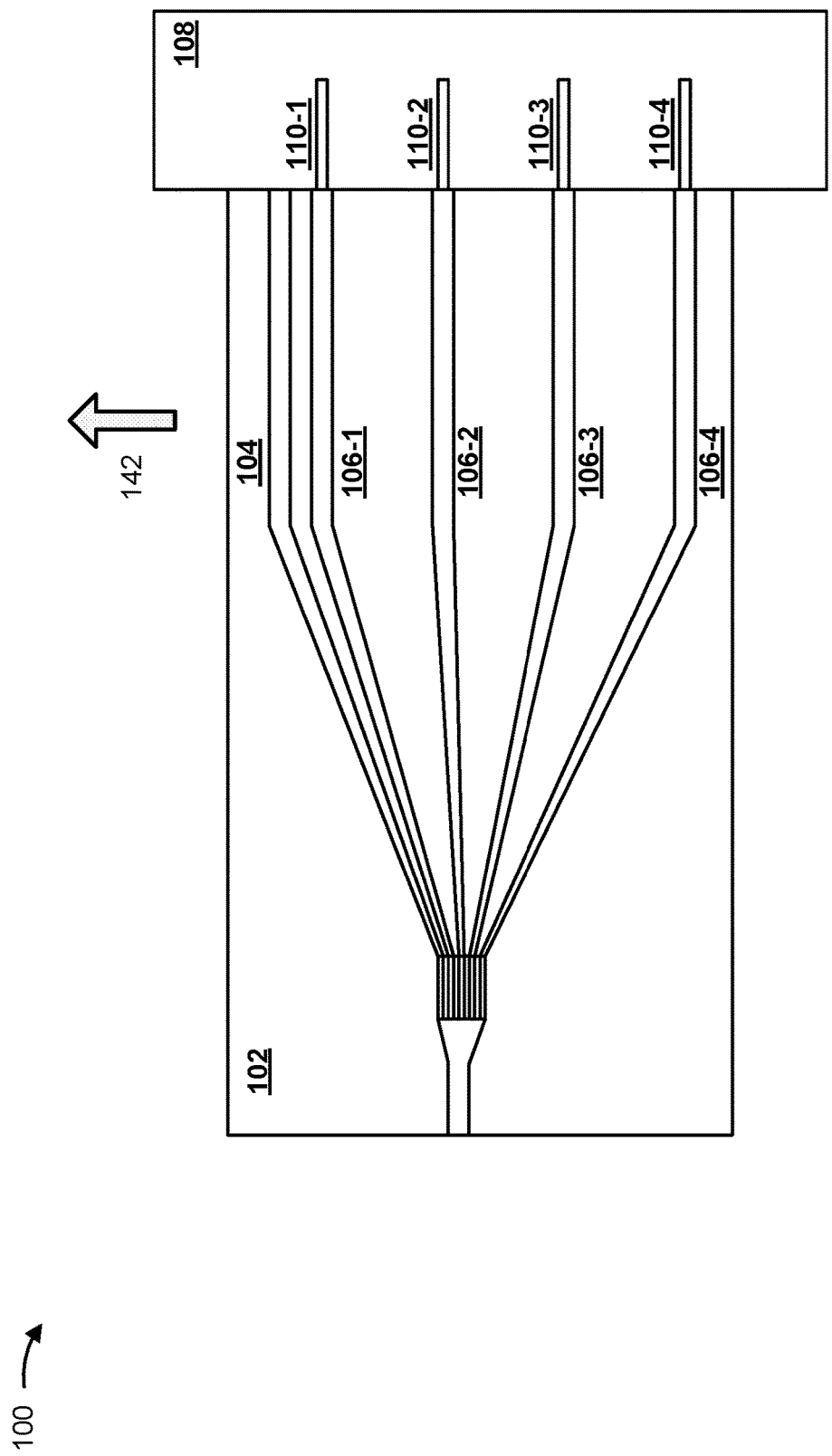

As shown in FIG. 1D, and by reference number 142, based on aligning single-mode waveguide 104 to photodiode 110-1, arrayed waveguide grating device 102 may be repositioned such that multi-mode waveguides 106 are aligned to photodiodes 110. For example, photodiode array 108 may be translated relative to arrayed waveguide grating device 102 by a translation distance equivalent to the fixed offset of single-mode waveguide 104 to multi-mode waveguide 106-1. In some implementations, photodiode array 108 may be translated to align multi-mode waveguides 106 to photodiodes 110. Additionally, or alternatively, arrayed waveguide grating device 102 may be translated to align multi-mode waveguides 106 to photodiodes 110. In this way, photodiodes 110 are aligned to multi-mode waveguides 106 with a same accuracy as single-mode waveguide 104 was aligned to photodiode 110-1, thereby improving an accuracy of the alignment, without use of complex alignment equipment, relative to attempting to achieve alignment based on an output of a multi-mode waveguide.

Figure 1E:
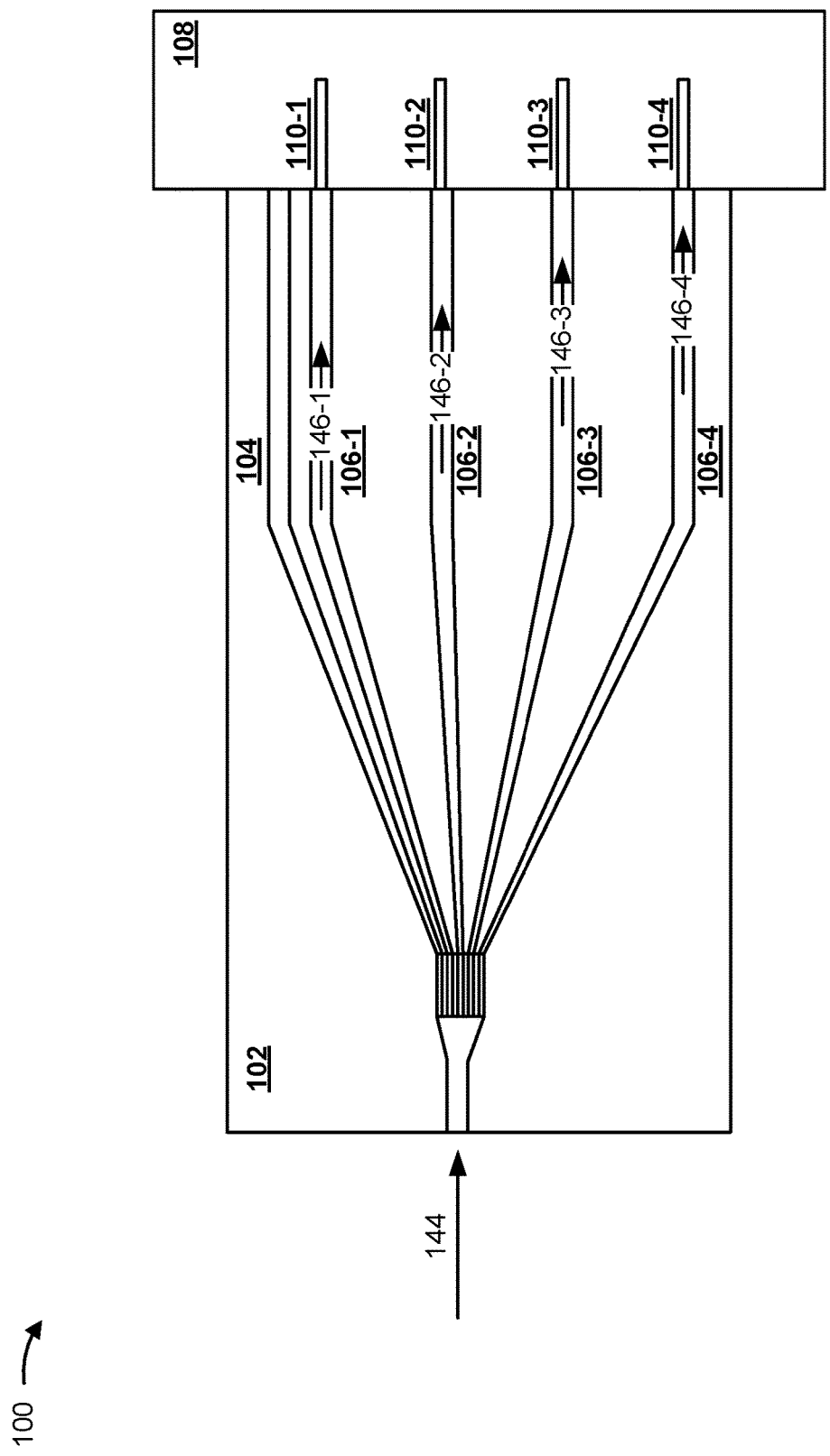

As shown in FIG. 1E, and by reference number 144, based on aligning multi-mode waveguides 106 to photodiodes 110, light may be provided via arrayed waveguide grating device 102. As shown by reference numbers 146-1, 146-2, 146-3, and 146-4, respective multi-mode waveguides 106 may provide the light as output, and respective photodiodes 110 may receive the light as input. In this way, arrayed waveguide grating device 102 and photodiode array 108 may be used to enable reception in a CWDM demultiplexer node.

As indicated above, FIGS. 1A-1E are provided merely as examples. Other examples are possible and may differ from what was described with regard to FIGS. 1A-1E.

Figure 2:
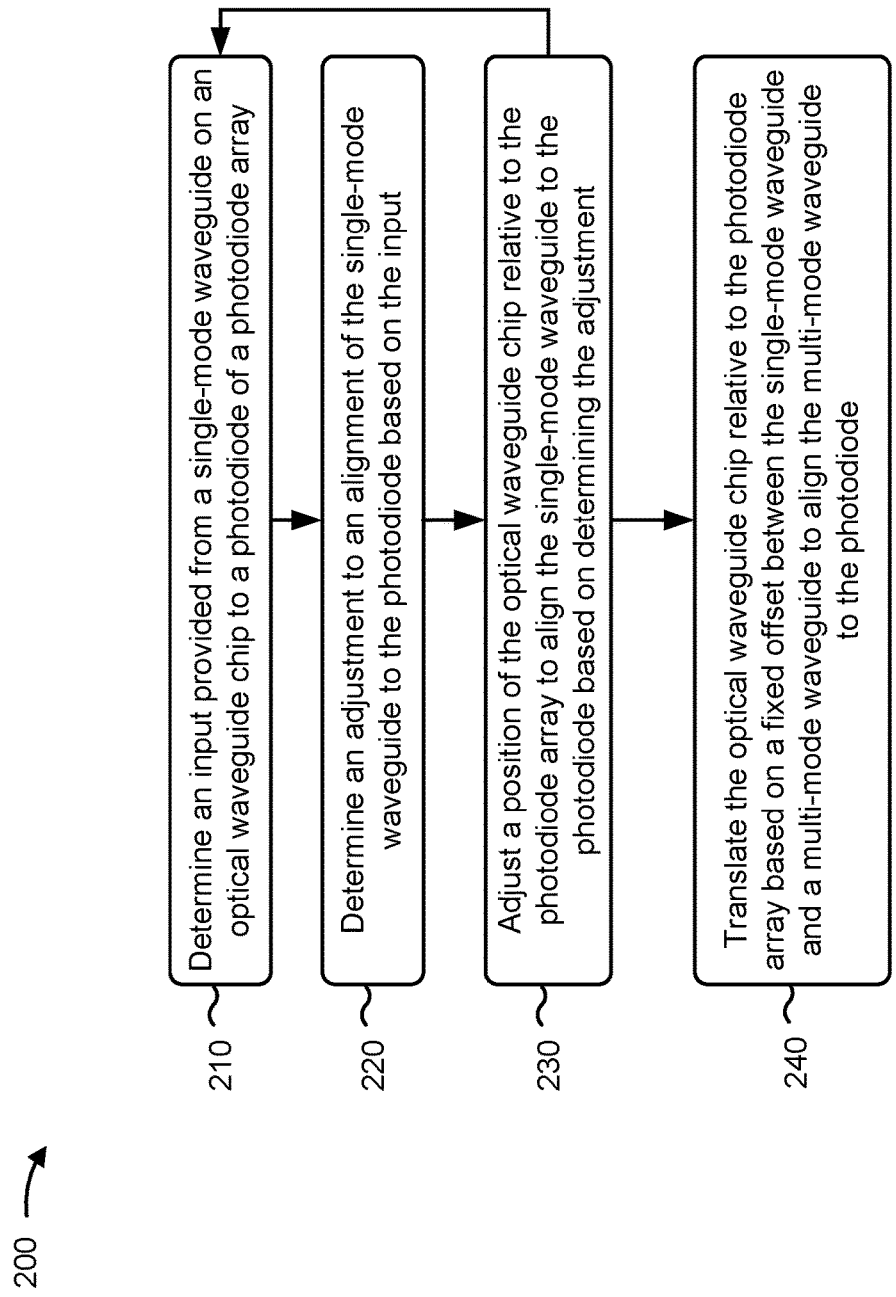
FIG. 2 is a flow chart of an example process for aligning an arrayed waveguide to a photodiode array described herein.

FIG. 2 is a flow chart of an example process 200 for aligning an arrayed waveguide grating device to a set of photodiodes. In some implementations, process 200 may be performed by a device, such as an alignment device, a measurement device, a manufacturing device, a controller, a processor, and/or the like.

As shown in FIG. 2, process 200 may include determining an input provided from a single-mode waveguide on an optical waveguide chip to a photodiode of a photodiode array (block 210). For example, a device may cause a light to be directed via the single-mode waveguide, which may be disposed on an optical waveguide chip (e.g., a PLC) that also includes a set of multi-mode waveguides, to a photodiode of a set of photodiodes of a photodiode array. In some implementations, the light may be associated with a wavelength outside of an operating range of the plurality of multi-mode waveguides. In some implementations, the device may cause the light to be provided via the single-mode waveguide based on aligning the single-mode waveguide to the photodiode. In some implementations, the device may cause light to be provided via multiple single-mode waveguides to multiple corresponding photodiodes. In some implementations, to couple the single-mode waveguide to the photodiode, a PLC onto which the arrayed waveguide is disposed, may be moved relative to a photodiode array. For example, the PLC may be rotated relative to the photodiode array to cause a plane passing through center-points of the multi-mode waveguides and single-mode waveguide align to a plane passing through center-points of the photodiodes. Additionally, or alternatively, the PLC may be moved linearly relative to the photodiode array to align a center-point of the single-mode waveguide to a center-point of a photodiode. In this case, a linear position may be adjusted based on a measurement of light, as described herein.

In some implementations, the device may measure an intensity of light. In some implementations, the device may receive information identifying a measurement of the intensity of the light. For example, based on receiving information identifying the measurement, the device may determine whether a response of the photodiode indicates that the intensity of the light satisfies a threshold. In this case, the device may determine that the single-mode waveguide is aligned to the photodiode within a threshold tolerance. In contrast, the device may determine that the intensity of the light does not satisfy the threshold (e.g., is not at a maximum intensity or within a threshold of a maximum intensity), may determine that the single-mode waveguide is misaligned to the photodiode. In this case, the device may determine to adjust the alignment of the single-mode waveguide to the photodiode as described herein.

As shown in FIG. 2, process 200 may include determining an adjustment to an alignment of the single-mode waveguide to the photodiode based on the input (block 220). For example, the device may determine an adjustment to the alignment of the single-mode waveguide to cause the single-mode waveguide to be aligned to the photodiode. In some implementations, the device may determine the adjustment such that a center-point of the single-mode waveguide is aligned to a center-point of the photodiode to within a threshold tolerance. For example, the device may determine that the single-mode waveguide, which may be disposed on the optical waveguide chip on a common plane with the set of multi-mode waveguides, is to be adjusted in a direction along the common plane to align the single-mode waveguide to the photodiode. In this case, the photodiode and one or more other photodiodes of a common printed circuit board (PCB) or another substrate (e.g., monolithically integrated onto a substrate, disposed on a die, etc.) may be aligned along a plane, and the plane of the PCB may be aligned to the plane of the optical waveguide chip, thereby enabling alignment of the single-mode waveguide to the photodiode based on translational adjustment along an axis formed by the planes. In some implementations, the substrate may be an indium phosphide (InP), a silicon substrate, a substrate with an indium gallium arsenide (InGaAs) material, a silicon germanium material, and/or the like. In some implementations, the substrate may be associated with a ceramic material (e.g., aluminum nitride (AlN), alumina, quartz, etc.), a metal material (e.g., Kovar, steel, etc.), a polyimide material, a liquid crystal polymer material, and/or the like. Additionally, or alternatively, the planes may be misaligned, and the alignment of the single-mode waveguide to the photodiode may be based on a rotational adjustment to align the planes to align to a common axis. In this case, the optical waveguide chip may include multiple single-mode waveguides corresponding to multiple multi-mode waveguides to enable rotational alignment of the planes and translational alignment along the axis.

As shown in FIG. 2, process 200 may include adjusting a position of the optical waveguide chip relative to the photodiode array to align the single-mode waveguide to the photodiode based on determining the adjustment (block 230). For example, the device may adjust the position of the optical waveguide chip relative to the photodiode array to align the single-mode waveguide to the photodiode. In some implementations, the device may iteratively adjust the position of the optical waveguide chip relative to the photodiode array. For example, the device may measure a first input, determine a first adjustment, and perform the first adjustment, then may measure a second input, determine a second adjustment, and perform the second adjustment. In this case, the iterative adjustment may continue until the single-mode waveguide is aligned to the photodiode (e.g., which may be determined based on a measured input and/or the like). In some implementations, the optical waveguide chip may be moved to align the single-mode waveguide to the photodiode array. In some implementations, the photodiode array may be moved to align the single-mode waveguide to the photodiode array.

In some implementations, the device may provide output indicating an adjustment that a technician is to perform. For example, the device may identify a distance by which the optical waveguide chip is to be moved relative to the photodiode array to enable a technician to move the optical waveguide chip and/or the photodiode array. As another example, the device may indicate an optical power measurement or a photocurrent from the photodiode and the technician may be instructed to increase the optical power measurement or photocurrent from the photodiode to achieve a threshold. In some implementations, the device may provide an instruction to another device, such as an alignment device to cause the other device to move the optical waveguide chip and/or the photodiode array.

As shown in FIG. 2, process 200 may include translating the optical waveguide chip relative to the photodiode based on a fixed offset between the single-mode waveguide and a multi-mode waveguide to align the multi-mode waveguide to the photodiode (block 240). For example, during operation, a device may cause the optical waveguide chip to be translated relative to the photodiode array based on a fixed offset between the single-mode waveguide and a multi-mode waveguide to align the multi-mode waveguide to the photodiode.

In some implementations, the device may align multiple multi-mode waveguides to multiple corresponding photodiodes. For example, based on translating the multiple multi-mode waveguides by the fixed offset, the multiple multi-mode waveguides, which may be associated with a set of fixed separations, may be aligned to the multiple corresponding photodiodes, which may also be associated with the set of fixed separations. In some implementations, the photodiode array may be moved by the fixed offset. In some implementations, the multiple multi-mode waveguides may be moved by the fixed offset. In some implementations, based on translating the multiple multi-mode waveguides relative to the multiple photodiodes, center-points of the multiple multi-mode waveguides may be aligned to center-points of the multiple photodiodes, and light may be provided via the multiple multi-mode waveguides to the multiple photodiodes to enable communication.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
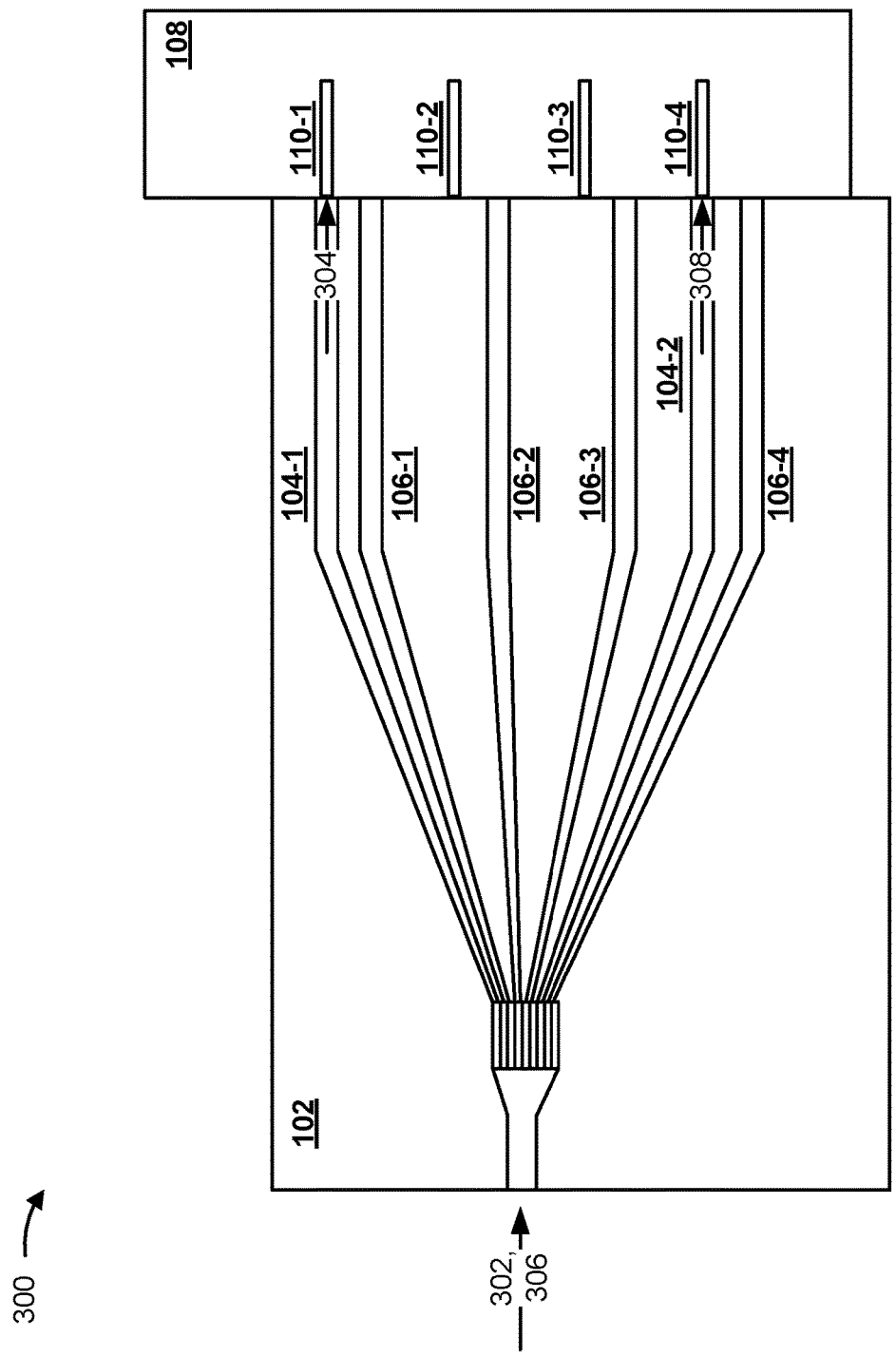
FIG. 3 is a diagram of an example implementation described herein.

FIG. 3 is a diagram of an example implementation 300 of alignment of an arrayed waveguide grating device to a set of photodiodes. As shown in FIG. 3, example implementation 100 includes an arrayed waveguide grating device 102 and a photodiode array 108.

As further shown in FIG. 3, arrayed waveguide grating device 102 may include multiple single-mode waveguides 104, such as single-mode waveguide 104-1, which is adjacent to and associated with a fixed offset from multi-mode waveguide 106-1, and single-mode waveguide 104-2, which is adjacent to and associated with the same fixed offset from multi-mode waveguide 106-4. As shown by reference numbers 302-308, light may be input, as shown by reference numbers 302 and 306, to and output by single-mode waveguide 104-1 and single-mode waveguide 104-2 respectively, and may be input, a shown by reference numbers 304 and 308, to photodiode 110-1 and photodiode 110-4 respectively to enable alignment of photodiodes 110 to multi-mode waveguides 106. In this case, a first adjustment to an alignment of photodiode array 108 to arrayed waveguide grating device 102 may be determined based on light input to photodiode 110-1 from single-mode waveguide 104-1, and a second adjustment to the alignment of photodiode array 108 to arrayed waveguide grating device 102 may be determined based on light input to photodiode 110-4 from single-mode waveguide 104-2. In some implementations, there may be multiple iterations of the alignment of single-mode waveguide 104-1 to photodiode 110-1 and of the alignment of single-mode waveguide 104-2 to photodiode 110-4. In this case, after adjusting the alignment based on the first adjustment and the second adjustment, photodiode array 108 may be translated relative to arrayed waveguide grating device 102 based on a fixed offset, thereby aligning multi-mode waveguides 106 to photodiodes 110.

As indicated above, FIG. 3 is provided merely as an example. Other examples are possible and may differ from what was described with regard to FIG. 3.

Figure 4A:
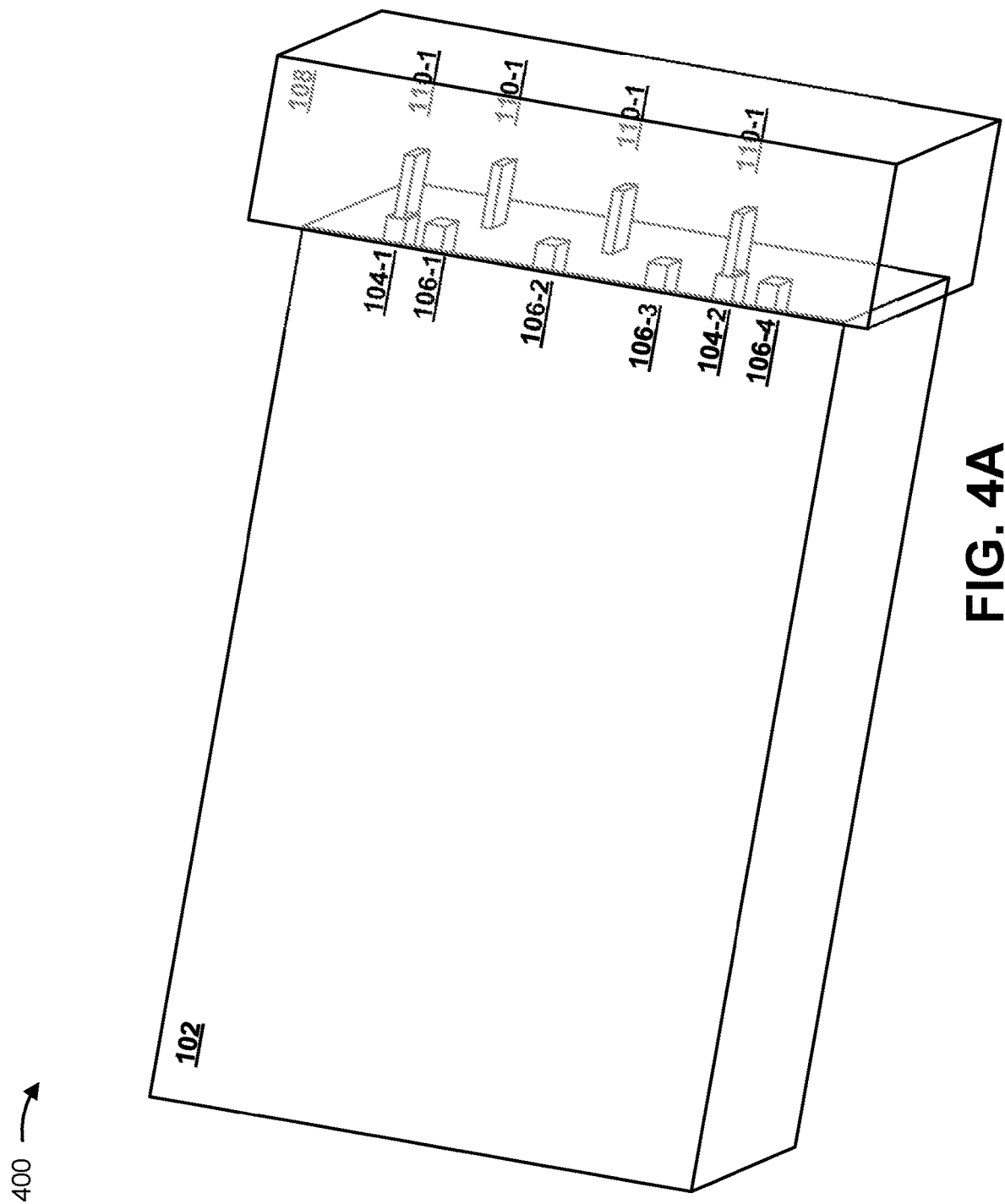
FIGS. 4A and 4B are diagrams of an example implementation described herein.
Figure 4B:
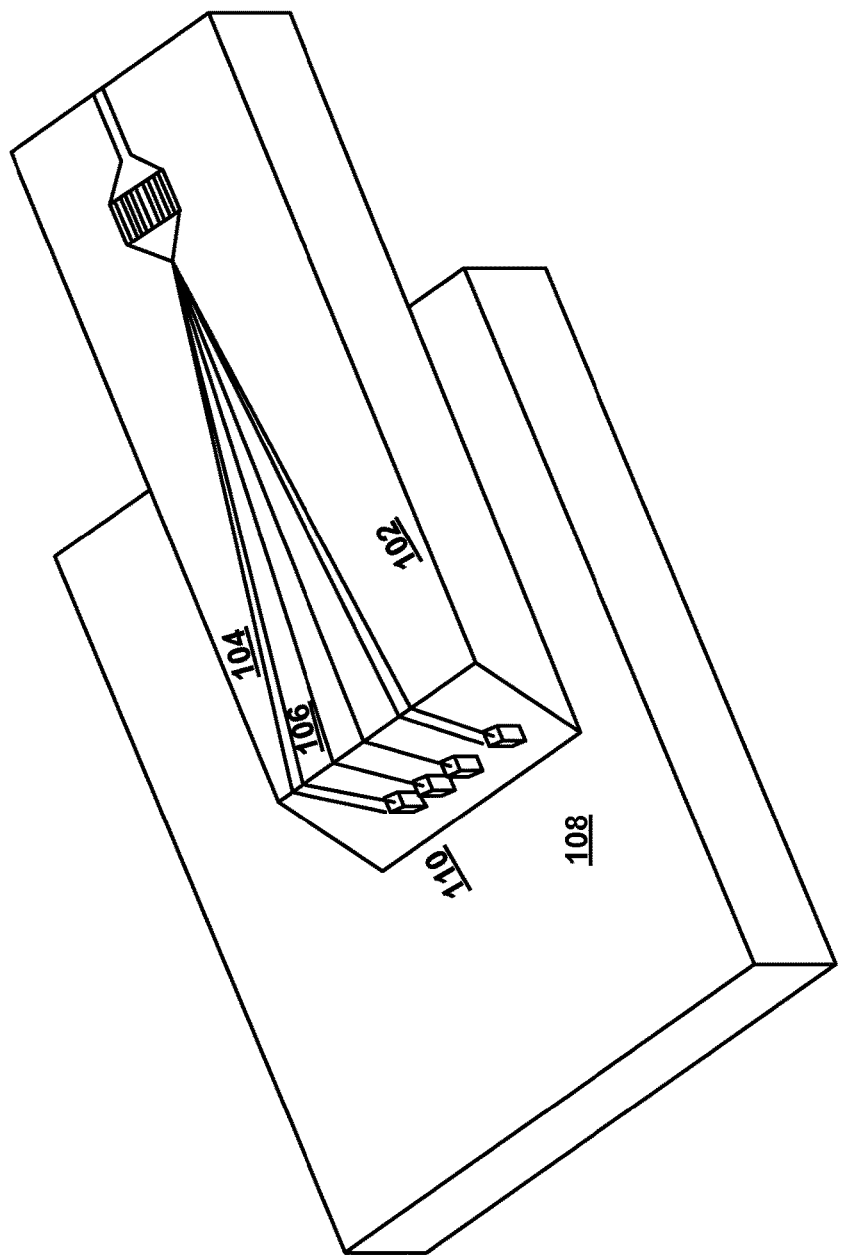

FIGS. 4A and 4B are diagrams of an example implementation 400 of alignment of an arrayed waveguide to a set of photodiodes. As shown in FIG. 4A, example implementation 400 includes an arrayed waveguide grating device 102 and a photodiode array 108.

As further shown in FIG. 4A, arrayed waveguide grating device 102 may include multiple single-mode waveguides 104, such as single-mode waveguide 104-1, which is adjacent to and associated with a fixed offset from multi-mode waveguide 106-1, and single-mode waveguide 104-2, which is adjacent to and associated with the same fixed offset from multi-mode waveguide 106-4.

As shown in FIG. 4B, a PLC onto which arrayed waveguide grating device 102 is disposed may be associated with an angled end, and which may cause arrayed waveguide grating device 102 to be angled. For example, single-mode waveguides 104 and multi-mode waveguides 106 may be associated with a 50 degree angled bend to direct light to photodiodes 110 on a surface of photodiode array 108. Although some implementations, described herein, are described in terms of a particular angle, other angles and/or geometric configurations are possible.

As indicated above, FIGS. 4A and 4B are provided merely as examples. Other examples are possible and may differ from what was described with regard to FIGS. 4A and 4B.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical device, comprising:
   a plurality of photodiodes,
      wherein alignment of the plurality of photodiodes with a fixed separation to a plurality of multi-mode waveguides disposed on an optical waveguide chip and with the same fixed separation is optimized by alignment of at least one of the plurality of photodiodes to at least one single-mode waveguide and translation of the optical waveguide chip relative to the plurality of photodiodes by a fixed offset of the at least one single-mode waveguide relative to the plurality of multi-mode waveguides.

2. The optical device of claim 1, wherein the optical waveguide chip is a planar lightwave circuit (PLC) and the optical device is to be translated relative to the PLC after alignment of the at least one of the plurality of photodiodes to the at least one single-mode waveguide to align the plurality of photodiodes to the plurality of multi-mode waveguides.

3. The optical device of claim 1, wherein a translation distance that the optical device is to be translated is a distance between the at least one single-mode waveguide and an adjacent at least one multi-mode waveguide of the plurality of multi-mode waveguides.

4. The optical device of claim 1, further comprising:
   a substrate including the plurality of photodiodes.

5. The optical device of claim 1, wherein the plurality of photodiodes is 4 photodiodes, the plurality of multi-mode waveguides is 4 multi-mode waveguides, and the at least one single-mode waveguide is 1 single-mode waveguide or 2 single-mode waveguides.

6. The optical device of claim 1, wherein the at least one single-mode waveguide and the plurality of multi-mode waveguides are outputs of an arrayed waveguide grating (AWG).

7. The optical device of claim 1, wherein light received from the at least one single-mode waveguide to optimize the alignment of the plurality of photodiodes is associated with a wavelength outside of an operation band of the plurality of multi-mode waveguides.

8. A method, comprising:
   determining, by a device, an input to a photodiode, of a set of photodiodes from a single-mode waveguide on a planar lightwave circuit (PLC) that has fixed separation from a set of multi-mode waveguides on the PLC;
   determining, by the device, an adjustment to an alignment of the single-mode waveguide to the photodiode based on the input to the photodiode; and
   providing, by the device, information identifying the adjustment of the alignment,
      wherein, after applying the adjustment to the alignment, the set of photodiodes is translated relative to the PLC based on a fixed offset of the single-mode waveguide to an adjacent multi-mode waveguide of the set of multi-mode waveguides to enable the set of photodiodes to receive an output of the set of multi-mode waveguides.

9. The method of claim 8, further comprising:
   aligning the single-mode waveguide to the photodiode; and
   causing light to be provided via the single-mode waveguide to the photodiode,
      wherein the light is associated with a wavelength outside of an operation band of the set of multi-mode waveguides.

10. The method of claim 8, further comprising:
    adjusting the alignment of the single-mode waveguide to the photodiode; and
    translating the set of photodiodes relative to the PLC by a translation distance corresponding to the fixed offset after adjusting the alignment to couple the set of photodiodes to the set of multi-mode waveguides.

11. The method of claim 8, further comprising:
    aligning the set of multi-mode waveguides to the set of photodiodes based on the adjustment of the alignment and a lithographically defined offset of the single-mode waveguide relative to the set of multi-mode waveguides.

12. The method of claim 8, further comprising:
    determining another input to the photodiode after adjusting the alignment based on determining the adjustment of the alignment;
    determining another adjustment to the alignment based on the other input; and
    providing information identifying the other adjustment to the alignment.

13. The method of claim 8, wherein the input is a first input, the photodiode is a first photodiode, and the single-mode waveguide is a first single-mode waveguide; and
    wherein the method further comprises:
       determining a second input to a second photodiode aligned to a second single-mode waveguide; and
       wherein determining the adjustment to the alignment comprises:
          determining the adjustment to the alignment based on the first input and the second input.

14. The method of claim 13, wherein the adjustment to the alignment is a plurality of adjustments to the alignment to optimize aligning the set of multi-mode waveguides to the set of photodiodes.

15. A planar lightwave circuit (PLC), comprising:
    a plurality of multi-mode waveguides; and
    at least one single-mode waveguide,
       wherein the at least one single-mode waveguide is separated from the plurality of multi-mode waveguides by a fixed separation, wherein the at least one single-mode waveguide is to provide an output to optimize an alignment of a plurality of outputs of the plurality of multi-mode waveguides.

16. The PLC of claim 15, wherein the plurality of multi-mode waveguides are couplable to a corresponding plurality of photodiodes; and
wherein the at least one single-mode waveguide is to provide the output to at least one of the corresponding plurality of photodiodes to optimize the alignment of the plurality of outputs of the plurality of multi-mode waveguides.

17. The PLC of claim 15, wherein the output of the at least one single-mode waveguide is associated with a wavelength outside of an operation band of the plurality of multi-mode waveguides.

18. The PLC of claim 15, wherein a data rate capacity of the plurality of multi-mode waveguides is greater than 100 gigabits per second.

19. The PLC of claim 15, wherein the PLC is alignable to a plurality of photodiodes based on a fixed offset of the at least one single-mode waveguide relative to the plurality of multi-mode waveguides.

20. The PLC of claim 15, wherein the at least one single-mode waveguide and the plurality of multi-mode waveguides are outputs of an arrayed waveguide.

* * * * *